United States Patent [19]

Berger

[11] 4,269,237

[45] May 26, 1981

[54] SUMP OIL DRAINING AND COLLECTING DEVICE

[76] Inventor: Jürgen Berger, Rheingaustr. 115, 6200 Wiesbaden, Fed. Rep. of Germany

[21] Appl. No.: 967,435

[22] Filed: Dec. 7, 1978

[30] Foreign Application Priority Data

Dec. 7, 1977 [DE] Fed. Rep. of Germany ....... 2754348

[51] Int. Cl.³ .............................................. B65B 3/04
[52] U.S. Cl. .................................. 141/346; 141/382; 141/383; 141/330; 141/311 R; 137/539; 184/1.5; 220/307; 220/DIG. 13; 222/544; 222/562
[58] Field of Search .................... 141/311 R, 346-362, 141/382-386, 207, 291-295, 19, 329, 330; 184/1.5, 106; 222/544, 562; 220/307, DIG. 13; 137/539

[56] References Cited

U.S. PATENT DOCUMENTS

| | | | |
|---|---|---|---|
| 619,705 | 2/1899 | Knupp | 137/539 |
| 1,559,704 | 11/1925 | Hubbard | 220/307 |
| 1,753,631 | 4/1930 | Walters | 220/307 |
| 2,929,401 | 3/1960 | Cowan | 137/539 |
| 3,032,014 | 5/1962 | Jablonsky | 137/539 |
| 3,219,057 | 11/1965 | Knowles | 137/539 |
| 3,262,599 | 7/1966 | Muller | 220/307 |
| 3,623,628 | 11/1970 | Rericha | 220/307 |
| 3,976,110 | 8/1976 | White | 141/382 |

Primary Examiner—Houston S. Bell, Jr.
Attorney, Agent, or Firm—Gifford, Van Ophem, Sheridan & Sprinkle

[57] ABSTRACT

A device for draining and collecting sump oil from a motor vehicle has a drain plug which is closed by a ball valve or rupturable membrane. Oil is drained from the sump by inserting a drain spigot into the plug body to open the valve, or to rupture the membrane, so that oil drains through a hose connected to the spigot into a shallow vessel which may be located beneath the vehicle. The vessel may be pyramid shaped or may, for example, be U-shaped so as to afford a clear working space beneath the sump. Two of the pyramid-shaped vessels may be held together base-to-base, one vessel being filled with fresh oil for sump replenishment.

17 Claims, 4 Drawing Figures

SUMP OIL DRAINING AND COLLECTING DEVICE

BACKGROUND OF THE INVENTION

This invention relates to a device for draining and collecting oil from motor-vehicle oil sumps.

In garages oil changes are made by draining used or old oil out of the oil-sump or crank-case of a vehicle. Garages which are equipped with elevating platforms for lifting automobiles have easy access to the oil sump drain plug and also have no difficulty in collecting the old oil.

The motorist who prefers to perform his own oil change is, however, faced with considerable difficulties. The automobile first has to be lifted and probably jacked up in order to obtain sufficient ground clearance to place a collecting vessel underneath the oil-sump; an appropriate tool is needed to loosen the oil-drain plug, and care must be taken to fit a new and correct seal for the oil-drain before refilling the crank-case with fresh oil.

The object of the present invention is to provide an oil-drain and oil collecting device enabling a motorist to perform an oil change easily and safely, avoiding the danger of oil spillage.

SUMMARY OF THE INVENTION

The invention accordingly provides an oil draining and collecting device for draining and collecting oil from a motor vehicle oil-sump, comprising:

a drain plug having a body provided with an oil outlet passage;

an oil collecting vessel;

a drain hose;

a drain spigot attached to one end of the hose and engageable in the oil outlet passage;

means for sealing the spigot to the body upon its insertion therein;

means for releasably locking the spigot to the body in a position in which the spigot is engaged in the passage, and means closing said outlet passage, said closure means being engageable by the spigot to open said passage upon insertion of the spigot therein.

BRIEF DESCRIPTION OF THE DRAWINGS

The invention will be further described, by way of example, with reference to the accompanying drawings, in which.

DETAILED DESCRIPTION OF THE ILLUSTRATED EMBODIMENTS

Figure 1:
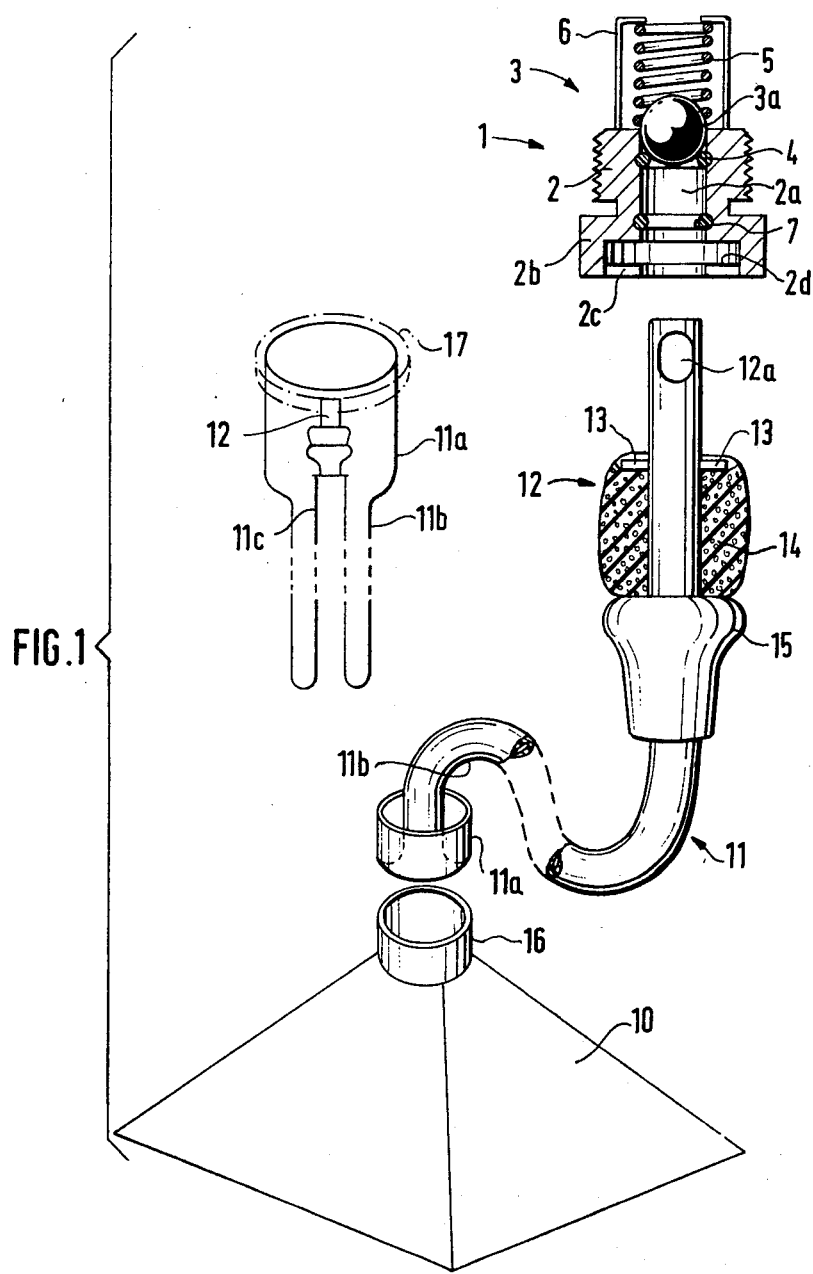
FIG. 1 is a diagrammatic representation, partly in section, of a device according to a first embodiment of the invention.
Figure 2:
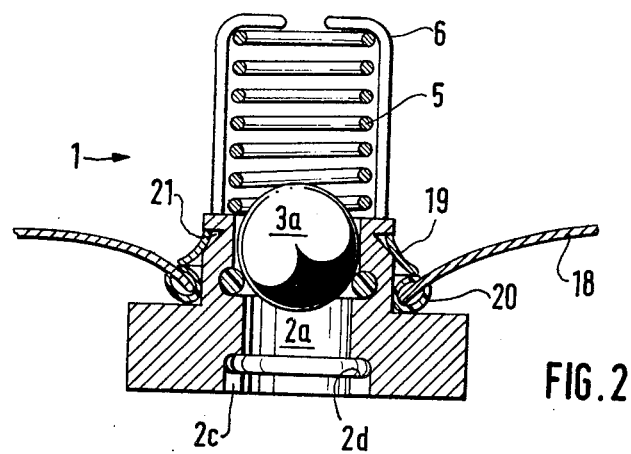
FIG. 2 is a sectional view of a detail of the device shown in FIG. 1.
Figure 3:
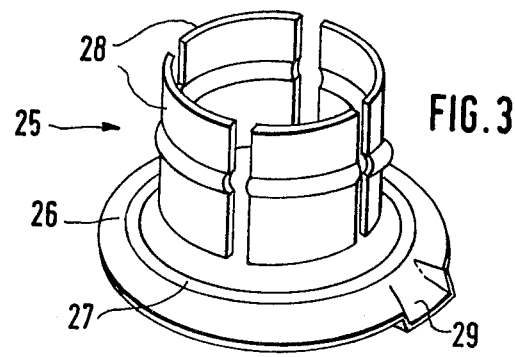
FIG. 3 is a perspective view of a bush forming part of the device according to the invention.

The device shown in FIGS. 1 to 3 includes an oil sump drain plug 1 which is fitted to the bottom wall of a sump. The plug 1 has a screw-threaded body 2 incorporating a ball valve 3. The body 2 is provided with a through bore 2a which is normally closed by the ball-valve 3. The body 2 is provided with an integral hexagon nut 2b which displays ring-lands or internal threads in the area of the oil-outlet channel 2a and two axial grooves 2c thereby forming internal bayonet-lock areas 2d. The internal end of the oil-outlet channel 2a is provided with an annular groove in which a circumferential seal 4 is seated. A helical spring 5 forces the ball 3a of the ball-valve 3 against the circumferential seal 4 effectively closing the valve 3. The spring 5 is anchored in the body 2 by means of a wire retaining cage 6. An additional circumferential seal 7 is provided in the port 2a projecting into the bore 2a.

A hose 11 connects a collecting vessel 10 for the old oil with a drain spigot 12, the diameter of which corresponds with the internal diameter of the circumferential seal 7. The spigot 12 is provided near its upper end with a cross bore 12a. At a distance from the free end of the spigot 12 equal to the length of the body 2, the spigot 11 has two outwardly projecting opposed pins 13 which can be located in axial slots 2c and rest behind the bayonet lands 2d adjoining the slots 2c circumferentially upon insertion of the spigot 12 into the oil-outlet port 2a and twisting of the spigot. The lands 2d and pins 13 accordingly form a bayonet interlocking device. A resilient plastic foam sealing element 14 surrounds the drain spigot 12 between the pins 13 and a hand grip 15. The sealing element 14 is pressed against the end face of the hexagonal body 2 as soon as the drain spigot 12 engages in the port 2a, sealing the connection between the ball valve 3 and the spigot.

The vessel 10 in the illustrated embodiment, shown on a reduced scale, is pyramid-shaped with a square base. The apex of the vessel 10 is provided with a cylindrical neck 16 into which a cup-shaped end portion 11a of the hose 11 is inserted, forming a seal. The hose 11 has a flexible portion 11b adjoining and formed integrally with the end portion 11a, which is of larger diameter than the flexible portion. When the device is not in use and the spigot 12 is disconnected from the plug 1 the flexible portion 11b can be turned inside-out and stowed within the vessel 10. A collapsed hose 11 ready for stowage is shown in phantom in FIG. 1, with the spigot 11 tucked inside the cup-shaped end portion 11a, which is closed by a removable lid 17.

FIG. 2 shows a variant of the oil-drain valve plug 1, in which an annular fixing collar 19 projects laterally outwardly in the assembled device and engages the inside surface of the base of the sump 18, surrounding a hole in the sump. Instead of the usual screw thread, the hole in the base of the sump 18 is provided with an annular sealing ring 20. In order to secure the ball valve 1 in the base of the sump 18 the annular collar 19 engages in a circumferential groove 21 and engages the base of the sump or the sealing ring 20 to hold the valve plug 1 securely.

FIG. 3 shows a closure cap 25 which can be inserted into the bore channel 2a of the drain plug 1 as an additional seal, to prevent the ingress of dirt into the open lower end of the bore 2a. The cap 25 is moulded in plastic material and comprises a flat circular base 26 provided with an annular sealing lip 27 and with a number of resilient cylindrical segments 28 upstanding from the base 26. The segments 28 are snap-engaged in the bore 2a of the plug 1 to seal the open lower end of the bore, without lifting the ball 3a from its seat. The edge of the base 26 is formed with one or more notches 29 into which a screwdriver or like tool can be inserted to pry the cap 25 out of engagement with the plug 1.

Figure 4:
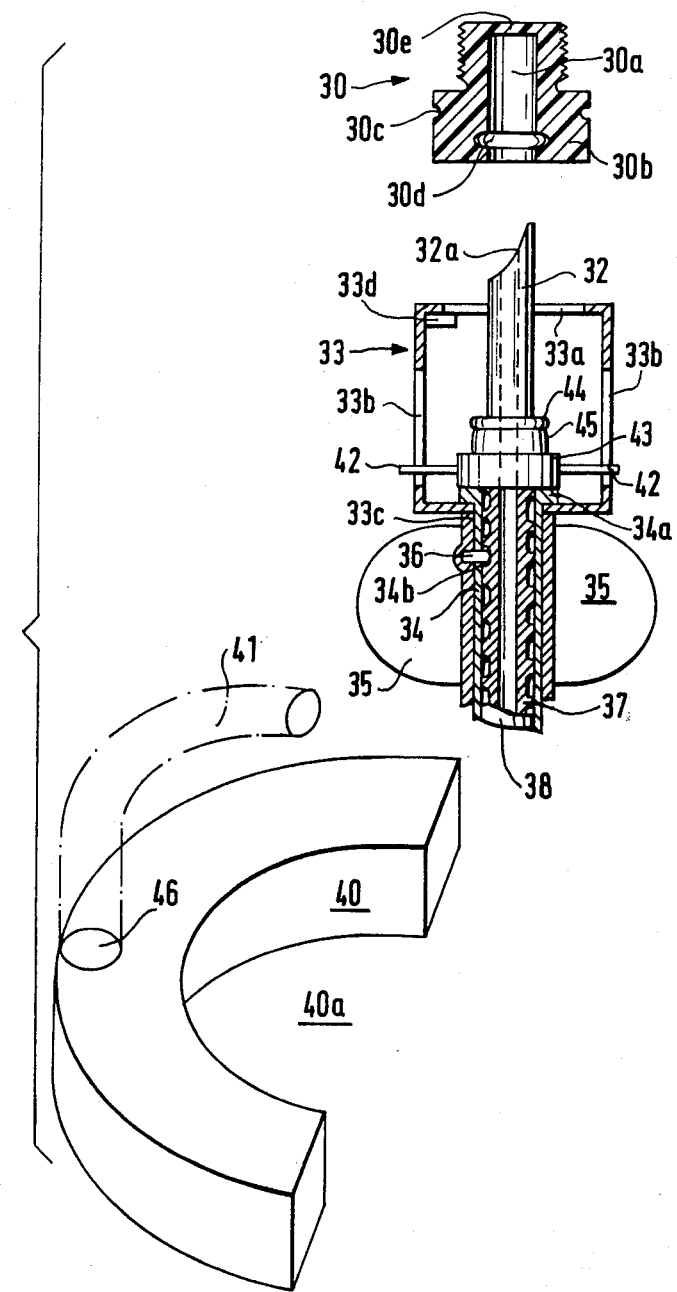
FIG. 4 is a diagrammatic representation, partly in section, of a device according to a second embodiment of the invention.

A second embodiment of the invention is illustrated in FIG. 4. In this case the oil-sump drain plug consists of a plastic moulded body 30 having an external screw-thread for engagement in a threaded hole in the base of a sump and an integral hexagonal head 30b. The body 30 has an internal bore 30a and is formed with an external annular groove 30c and an internal annular groove 30d. The bore 30a is closed at its inner end by a membrane 30e moulded integrally with the body 30.

When the plug body 30 is screwed into the drain hole in the base of the oil-sump, the hole is effectively sealed by the membrane 30e. In order to drain the sump the membrane 30e is ruptured by means of a tubular drain spigot 32 having a cutting edge 32a at its free end. The cutting edge 32a tapers to a point, so that viewed laterally the cutting edge has a parabolic shape. This avoids the possibility of the inner open end of the spigot 32 being blocked by the membrane 30e after the latter has been ruptured and tilted upwardly by insertion of the spigot 32 into the bore 30a.

The drain spigot 32, like the drain spigot 12 of FIG. 1, may be provided with diametrically opposed pins similar to the pins 13 of the spigot 12, for insertion through axial slots in the body 30 and engagement in the internal groove 30d in the manner of a bayonet fitting. It is also possible to facilitate the penetration of the membrane 30e by rotating the spigot 32 about its axis, using a handle 35 formed with integral finger-grips, as described later.

A support cage 33 surrounding the spigot 32 has at its free end a hexagonal aperture 33a corresponding in size to the hexagon head 30b. Two longitudinal guide slots 33b are formed in the sides of the cage 33 and a circular opening 33c is provided at the end opposite the aperture 33a for fitting the cage 33 to a tubular ferrule 34 surrounding one end of a drain hose 41. The ferrule 34 has an external flange 34a and a lateral hole 34b through which a pin 36 passes, the pin 36 being attached to the handle 35, which fits over the ferrule 34. A hollow spindle 37 connects the drain spigot 32 with one end of the hose 41, and fits inside the end of the hose 41 which is surrounded by the ferrule 34. A collar 43 is formed at the end of the spindle 37 and has two transverse pins 42 which engage in the slots 33b of the support cage 33. The pin 36 engages in a helical groove 37a formed in the surface of the spindle 37. Upon rotation of the handle 35, therefore, the spindle 37 is confined to movement longitudinally relative to the spigot 32, and is unable to rotate. By rotating the handle 35 the ferrule 34 together with the pin 36 is rotated, and causes axial displacement of the spindle 37 and the spigot 32 relative to the cage 33, the spindle 37 being prevented from rotating by the engagement of the pins 42 in the slots 33b of the cage 33.

To penetrate the membrane 30e of the plug body 30, the spigot 32 is first inserted into the bore 30a, the support cage 33 being fitted over the hexagonal head 30b until a lip defining the edge of the hexagonal aperture 33a snaps into the groove 30c and is locked therein. A stop 33d is formed on the support cage 33 and bears against the hexagonal head 30b when the cage 33 has been fitted correctly. With the support cage 33 locked to the plug body 30 in this way, the handle 35 is rotated, causing the hollow spindle 37 together with drain spigot 32 to be displaced axially by the engagement of the pin 36 in the helical groove in the spindle 37, so that the cutting edge 32a penetrates the membrane 30e. By turning the handle 35 in the opposite direction, the connection can be disengaged. A rubber sealing ring 44 and a collar 45 provide a seal between the spigot 32 and the wall of the bore 30a.

The drain hose 41 leads into a horseshoe-shaped vessel 40. This shape of vessel has the advantage of affording a clear working space 40a beneath the vehicle when carrying out an oil change with restricted headroom. A screw connection 46 is provided for connecting the hose 41 to a central part of the U-shaped vessel 40. This screw connection also serves as a discharge outlet when disconnected from the vessel 40. Other U-shaped configurations for the vessel, including shapes with straight or angular sides, may be adopted.

The pyramid shaped oil collecting vessel 10 shown in FIG. 1 can form an octahedral structure by adding a second pyramid shaped vessel 10, with the bases of the pyramids laid on top of one another and are interconnected by, for example, an elastic band. The second vessel may serve as a reserve oil container, the two vessels being of a size and shape such that they can easily be accommodated in the trunk of an automobile. One of the vessels 10 would be empty and ready to collect the old oil drained from the sump, as described previously, whilst the other vessel would contain fresh oil and could later also be used for the collection of old oil. Once both vessels had been filled with old oil the motorist would be forced to dispose of the old oil thus collected in order to empty one of the vessels for replenishment with a supply of fresh oil.

I claim:

1. A device for draining and collecting oil from a motor vehicle oil sump, comprising:
   a drain plug having a body provided with an oil outlet passage;
   an oil collecting vessel,
   a drain hose,
   a drain spigot attached to one end of the hose and engageable in the oil outlet passage,
   means for sealing the spigot to said body upon its insertion therein;
   means for releasably locking the spigot to the body in a position in which the spigot is engaged in said passage, and
   means closing said outlet passage, said closure means being engageable by the spigot to open said passage upon insertion of the spigot therein.

2. The device defined in claim 1, wherein the drain plug is provided with a ball valve inside the oil-outlet passage, the ball valve comprising a seat within the outlet passage and a ball engageable with the seat to close said passage, the drain spigot upon insertion into and locking in said body engaging said ball and lifting it from its seat, said spigot having a tubular wall with at least one aperture communicating with the interior of the sump when the ball is lifted from its seat by the spigot.

3. The device defined in claim 2, wherein the ball-valve includes a wire cage and a helical spring which presses the ball against the seat and is housed in said cage.

4. The device defined in claim 2 including a detachable closure cap engageable with the body to seal the open end of the oil outlet passage.

5. The device defined in claim 4, wherein the closure cap consists of a circular base provided with an annular sealing element and a number of resilient cylindrical segments engageable in the said oil outlet passage.

6. The device defined in claim 1, wherein the body of the drain plug is provided with a rupturable membrane in the oil outlet passage adapted to be ruptured by the drain spigot upon the insertion of the latter into said passage.

7. The device defined in claim 1, wherein the locking means comprise two pins projecting laterally from the drain spigot, and cooperating bayonet sockets in the body of the drain plug.

8. The device defined in claim 1, wherein the drain plug body is formed with a hexagon head and the locking means comprise a circumferential groove on the outside of the drain plug body and a support cage which is attached to the drain spigot, said support cage having an inwardly projecting lip defining a hexagonal aperture which fits over the hexagon head, the cage being provided with stop means engageable with said head, and said lip snap-engaging in said circumferential groove to retain said cage during axial displacement of the drain spigot relative to said cage.

9. The device defined in claim 1, wherein the drain spigot is provided with a resilient seal which is compressed against the exterior of the drain plug body upon insertion and locking of the drain spigot in the outlet passage.

10. The device defined in claim 1 wherein the drain spigot is provided with a sealing element which makes sealing contact with the internal surface of the oil-outlet passage upon insertion and locking of the drain spigot in the said passage.

11. The device defined in claim 6 wherein the drain spigot is provided with a cutting edge adapted to penetrate the membrane.

12. The device defined in claim 11, wherein the cutting edge defines a laterally facing opening of larger area than the membrane, so that even if the ruptured membrane were to mask said opening a part of the opening would remain free.

13. The device defined in claim 8 including a hollow spindle in which the drain spigot is fitted, the spindle in turn being sealingly fitted to said one end of the hose, said spindle having helical screw means on its surface, and a handle rotatable upon the spindle and engageable with said helical screw means to displace the spindle and the spigot axially upon rotation of the handle, rotation of the cage and the spigot being prevented by engagement of the stop means with said head.

14. The device defined in claim 1, wherein the vessel is shaped to define a working space beneath the vehicle sump.

15. The device defined in claim 1, wherein the vessel is conical or of pyramid shape.

16. The device defined in claim 1, wherein the drain hose is adapted to be collapsed for stowage by tucking the said one end of the hose including the drain spigot into the interior of the hose.

17. The device defined in claim 15, wherein there are two said vessels of pyramid shape joined together to form an octahedron.

* * * * *

UNITED STATES PATENT AND TRADEMARK OFFICE
CERTIFICATE OF CORRECTION

PATENT NO. : 4,269,237
DATED : May 26, 1981
INVENTOR(S) : Jurgen Berger

It is certified that error appears in the above-identified patent and that said Letters Patent are hereby corrected as shown below:

Column 1, line 68, delete "through bore" and insert --throughbore-- therefor;

Column 4, line 25, delete "whilst" and insert --while-- therefor.

Signed and Sealed this

Eighteenth Day of August 1981

[SEAL]

Attest:

Attesting Officer

GERALD J. MOSSINGHOFF

Commissioner of Patents and Trademarks